(12) United States Patent
Speggiorin et al.

(10) Patent No.: US 11,608,934 B2
(45) Date of Patent: Mar. 21, 2023

(54) TRIPOD FOR VIDEO-PHOTOGRAPHIC EQUIPMENT

(71) Applicant: VITEC IMAGING SOLUTIONS S.P.A., Cassola (IT)

(72) Inventors: Paolo Speggiorin, Mussolente (IT); Simone Fontana, Marano Vicentino (IT); Stelvio Zarpellon, Bassano del Grappa (IT)

(73) Assignee: VITEC IMAGING SOLUTIONS S.P.A., Cassola (IT)

( * ) Notice: Subject to any disclaimer, the term of this patent is extended or adjusted under 35 U.S.C. 154(b) by 0 days.

(21) Appl. No.: 17/279,140

(22) PCT Filed: Sep. 24, 2019

(86) PCT No.: PCT/IB2019/058073
§ 371 (c)(1),
(2) Date: Mar. 24, 2021

(87) PCT Pub. No.: WO2020/065514
PCT Pub. Date: Apr. 2, 2020

(65) Prior Publication Data
US 2021/0396349 A1 Dec. 23, 2021

(30) Foreign Application Priority Data
Sep. 26, 2018 (IT) .................. 102018000008936

(51) Int. Cl.
*F16M 11/34* (2006.01)
*F16B 7/14* (2006.01)
*F16M 11/36* (2006.01)

(52) U.S. Cl.
CPC ........... *F16M 11/34* (2013.01); *F16B 7/1454* (2013.01); *F16M 11/36* (2013.01); *F16M 2200/028* (2013.01)

(58) Field of Classification Search
CPC .. F16M 11/34; F16M 11/36; F16M 2200/028; F16M 2200/027; F16M 11/32;
(Continued)

(56) References Cited

U.S. PATENT DOCUMENTS 5,503,357 A * 4/1996 Johnson ................. F16M 11/16
248/188.5
5,887,835 A * 3/1999 Hein ....................... F16M 11/26
248/161
(Continued)

FOREIGN PATENT DOCUMENTS

WO 2002090819 A2 11/2002

*Primary Examiner* — Christopher Garft
(74) *Attorney, Agent, or Firm* — Volpe Koenig

(57) ABSTRACT

A tripod for video-photographic equipment, includes: at least one leg having a first, a second and a third section that engage so as to axially slide in a telescopic manner one after the other; a first clamping device that is provided between the first and the second section and a second clamping device that is provided between the second and the third section, an actuating element that is connected to the first clamping device, a transmission element that connects the first and the second clamping device such that the movement of the first clamping device causes the second clamping device to move in a similar manner so that said first and second clamping devices simultaneously clamp and release, and an adjustment member that is provided at the first clamping device in order to adjust the second clamping device via the transmission element.

11 Claims, 3 Drawing Sheets

(58) Field of Classification Search
CPC ....... F16M 11/26; F16M 11/24; F16B 7/1454; F16B 7/1463; F16B 7/14; F16B 7/105
See application file for complete search history.

(56) References Cited

U.S. PATENT DOCUMENTS

| | | | | |
|---|---|---|---|---|
| 6,082,685 | A * | 7/2000 | Hein | F16M 11/26 |
| | | | | 248/161 |
| 6,286,795 | B1 * | 9/2001 | Johnson | F16M 11/16 |
| | | | | 248/188 |
| 6,702,482 | B2 * | 3/2004 | Sherwin | F16M 11/34 |
| | | | | 396/428 |
| 7,178,767 | B2 * | 2/2007 | Steyn | F16B 7/14 |
| | | | | 248/440 |
| 7,654,494 | B2 | 2/2010 | Cartoni et al. | |
| 2001/0010764 | A1 * | 8/2001 | Sherwin | F16M 13/00 |
| | | | | 396/428 |
| 2007/0125915 | A1 * | 6/2007 | Hein | F16M 11/28 |
| | | | | 248/161 |
| 2010/0282921 | A1 * | 11/2010 | Hein | F16M 11/32 |
| | | | | 248/125.8 |
| 2018/0252354 | A1 * | 9/2018 | Brady | F16B 2/185 |

\* cited by examiner

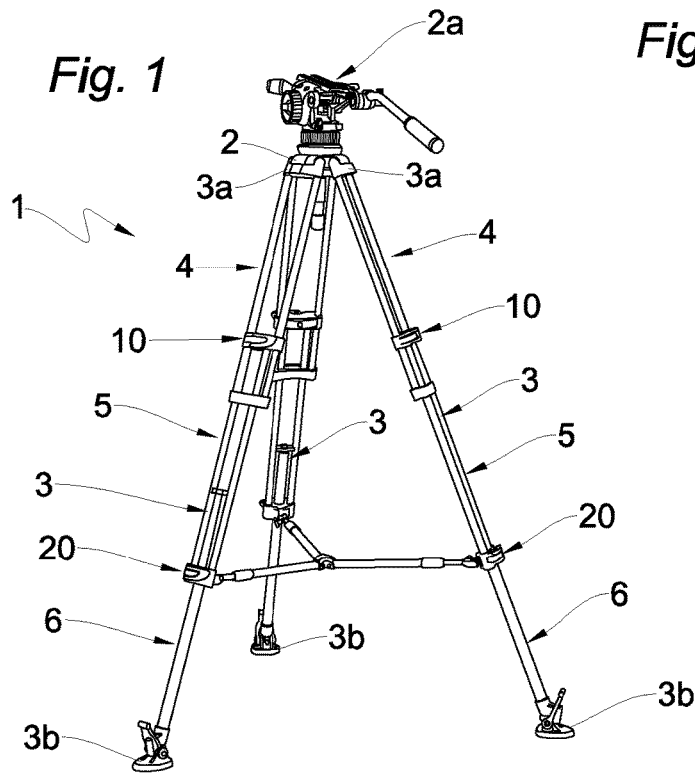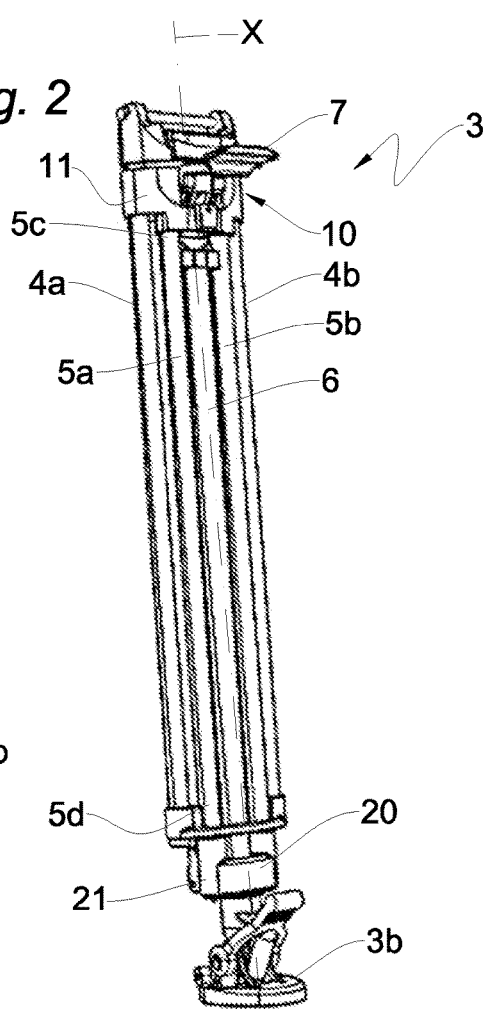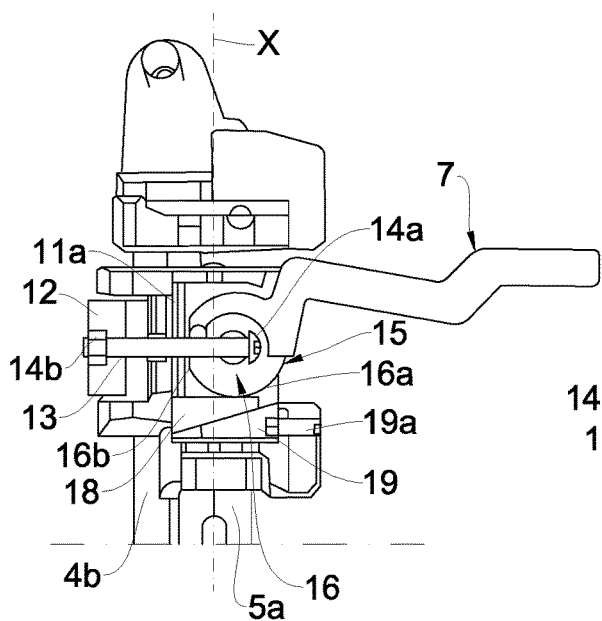

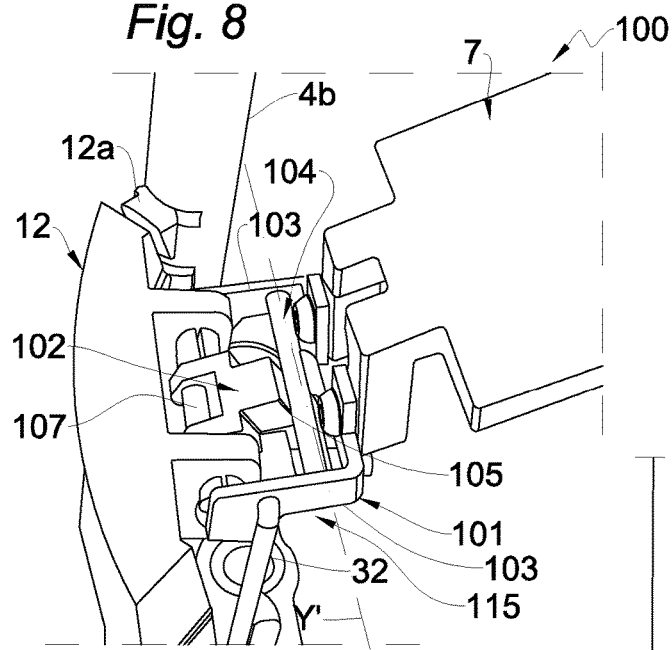
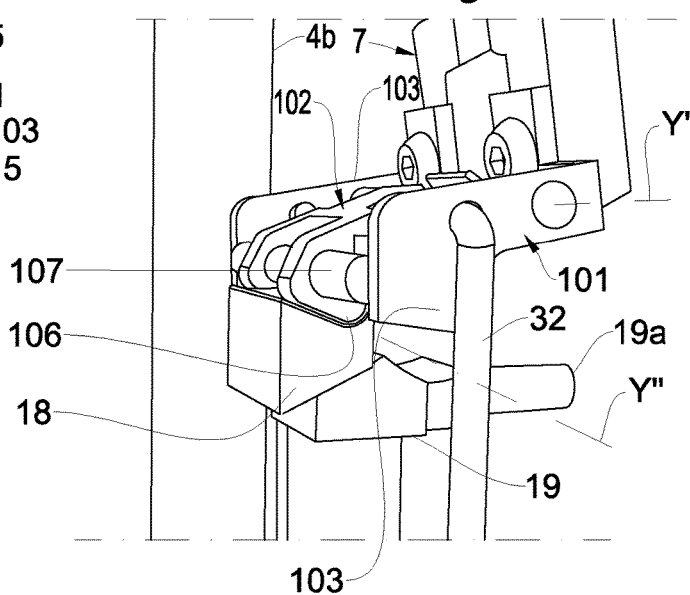
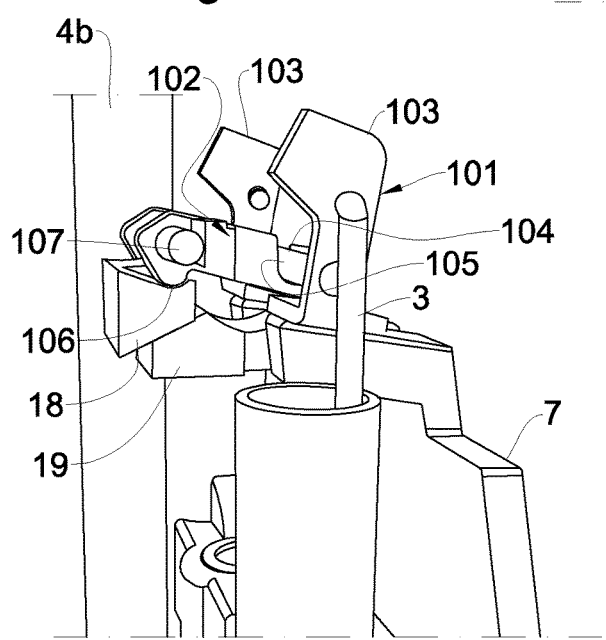

TRIPOD FOR VIDEO-PHOTOGRAPHIC EQUIPMENT

TECHNICAL FIELD

The present invention relates to a tripod for video-photographic equipment having the features stated in the preamble of the main claim.

TECHNOLOGICAL BACKGROUND

Tripods are support devices that are commonly used in the photography industry and generally comprise a plurality of telescopic legs, which are all hinged by a particular end thereof to a spider, on which a head for supporting the video-photographic equipment may be mounted, for example.

Tripod legs generally comprise at least three sections that engage with one another in order to telescopically slide inside one another so as to be able to quickly move from a compact configuration, which is useful for transporting and storing the tripod, into an extended configuration, in which the tripod can be used as a stable support for the video-photographic equipment.

Respective clamping devices are also provided between one section and another of the extendable legs and can be operatively controlled by the user in order to clamp or, alternatively, release the relative sliding motion between consecutive sections, therefore making it possible to move between the above-mentioned compact and extended configurations, and also adjusting the relative degree to which each pair of sections is extended.

In the relevant technical field, furthermore, tripods are known whereby the devices for clamping the telescopic sections of the legs can be simultaneously controlled by a single control element such that the user can advantageously drive the clamping and/or releasing of all the telescopic sections of the leg with just one movement.

Furthermore, tripods are known in which at least one of the telescopic sections of the extendable legs is formed by a pair of parallel tubes that are spaced apart from one another.

This type of construction makes it possible to have more rigid legs and consequently a more stable tripod, a feature that is especially important when the equipment mounted on the tripod is moved during use, for example when shooting a panoramic video.

US patents U.S. Pat. Nos. 5,887,835, 6,082,685, 6,702,482 and 7,654,494 describe respective examples of tripods that have a single control for clamping or releasing the telescopic sections of the legs.

However, single-control tripods that are formed in accordance with the prior art described above have a number of disadvantages, including, for example, the fact that the clamping force exerted by the clamping devices may be unbalanced, for example very strong clamping between the first and the second section and insufficient clamping between the second section and the third section.

This situation can be corrected by providing respective adjustment members that act on the respective clamping devices separately and independently in order to adjust the tightening action exerted by each device. However, this operation can be inconvenient and laborious for the user.

The term "section" of a leg means a rigid portion of the leg that extends longitudinally along the axis of the leg and can slide axially with respect to other similar portions. A section may comprise a single tube or several tubes that are parallel to the axis of the leg.

"Cam-type element" means an element that is intended to oscillate about an axis of rotation, which is not necessarily a fixed axis of rotation, and comprises an at least partially eccentric outer surface such that, following this oscillatory movement, an element that is in contact with the outer surface of the cam-type element is moved.

DESCRIPTION OF THE INVENTION

The problem addressed by the present invention is that of providing a tripod for video-photographic equipment, the structure and function of which are designed to overcome, at least in part, one or more of the limitations described above with reference to the cited prior art.

This problem is solved by the present invention by means of a tripod formed in accordance with the claims that follow.

Therefore, in its first aspect, the present invention is directed to a tripod for video-photographic equipment, comprising at least one leg that can be telescopically extended between a retracted configuration and an extended configuration, and comprising a first section, a second section that engages with the first section so as to slide axially and a third section that engages with the second section so as to slide axially.

The tripod preferably comprises a first clamping device provided between the first section and the second section for clamping or releasing the relative axial sliding motion thereof, and a second clamping device provided between the second section and the third section for clamping or releasing the relative axial sliding motion thereof.

The tripod preferably also comprises a control element that is connected to the first clamping device for controlling the clamping or releasing thereof, and a transmission element that connects the first and the second clamping device such that the movement of the first clamping device causes the second clamping device to move in a similar manner such that the first and the second clamping devices are clamped and released substantially simultaneously.

The tripod preferably also comprises a member for adjusting the second clamping device, which is provided at the first clamping device in order to adjust the second clamping device by means of the transmission element.

In this way, the tightening action of the second clamping device can be advantageously adjusted at the first clamping device where the only control element for the two clamping devices is also already provided.

This allows the user to carry out adjustments, bringing the adjustment members into a position that is more convenient for, and easily accessible to, the user.

In the above-mentioned aspect, the present invention can also comprise one or more of the preferred features described below.

The first section preferably comprises a pair of parallel tubes.

The first clamping device preferably comprises a first housing that is fixed to a first end of the second section that faces a spider of the tripod.

The first section can preferably slide inside a seat made in the first housing.

In a preferred embodiment, the second section is also formed by a pair of parallel tubes that are substantially coplanar with respect to the tubes of the first section and are arranged between the tubes of the first section.

The first clamping device preferably comprises a first runner that can move away from and towards the first section in order to clamp or release the relative sliding motion thereof.

The first clamping device preferably comprises a first actuator that is connected to the control element and to the first runner so as to move the first runner away from and towards the first section when the first actuator is moved by the control element.

In particular, the first runner is preferably moved away from and towards the first section following an oscillatory movement of the first actuator that is brought about by the actuation of the control element.

The second clamping device preferably also comprises a second housing fixed to a second end of the second section, which is opposite the first end and therefore faces a base of the leg.

The third section is preferably formed by a single tube that can slide inside a seat made in the second housing.

The second clamping device preferably comprises a second runner that can move away from and towards the third section in order to clamp or release the relative sliding motion thereof with respect to the second section, and a second actuator that is connected to the second runner and to the transmission element such that the second runner can be moved away from and towards the third section when the second actuator is moved by the transmission element.

The second runner is preferably moved away from and towards the third section following an oscillatory movement of the second actuator that is brought about by the movement of the transmission element.

The first and the second runners are similar to one another and are preferably moved in a translational manner against the tube (or tubes) that form(s) the section to be clamped. The first and the second runner can come into direct contact with the tube (or tubes) to be clamped, or, in a preferred version, can push a pair of braking elements, which are axially spaced apart, in a direction that has both a radial component (for tightening the tube against the particular sliding seat made in the housing of the clamping device) and an axial component (for clamping any oscillatory movements of the tube inside the housing of the clamping device, thereby recovering clearance and dimensional tolerances) for each tube.

The first and the second runner can be moved by the first and the second actuator, respectively, towards the particular section to be clamped by means of a pushing action or a tractive action.

Furthermore, the first and the second runner can be pushed away from the particular section to be clamped by a spring or other resilient element.

The transmission element is preferably connected to the first actuator such that an oscillatory movement of the first actuator causes the transmission element to move and the second actuator to consequently oscillate.

The transmission element is preferably formed by a rigid rod, more preferably by a pair of rigid rods.

In one embodiment, the transmission element extends inside a tube of the second section between the first and the second clamping device, or, if the transmission element is formed by a pair of rigid rods and the second section comprises a pair of parallel tubes, the rods extend inside the pair of tubes.

In this way, the transmission elements are not visible from the outside and are also suitably protected against possible impacts, without additional protective components being provided.

Furthermore, the provision of a pair of rods makes it possible to transmit a balanced force to the second clamping device.

The adjustment member is preferably provided to move the first clamping device with respect to the second section. This changes the spacing between the first clamping device and the second clamping device and, as a result, the action of the transmission element on the second actuator.

In particular, the adjustment member preferably comprises a slider that can slide inside the first housing and on which the first actuator is supported.

The adjustment member preferably also comprises a wedge that is arranged between the slider and the first housing in order to move the slider with respect to the first housing.

In particular, the first actuator is moved further away from, or closer to, the second clamping device in a direction that is substantially parallel to the longitudinal axis of the leg.

This makes it possible to vary the distance between the first and the second actuator, thereby taking advantage of the action of the transmission element and the connection thereof to the first and the second actuator, to modify an initial position of the second actuator with respect to the first actuator, and consequently the initial position of the second runner with respect to the third section.

The wedge can be moved by a threaded pin that can be actuated from the outside by means of a common driving tool, such as a screwdriver.

In a first embodiment of the invention, the first actuator comprises a cam-type element that can be oscillated about an axis of rotation thereof by means of the control element.

The control element is preferably integrally fixed to the cam-type element.

The cam-type element is preferably connected to the first runner by means of a tie-rod, which is more preferably connected to the cam-type element at its axis of rotation.

The transmission element is preferably connected to the cam-type element in an eccentric position with respect to the axis of rotation. In this way, when the cam-type element is oscillated about its axis of rotation, the transmission element is moved along an arc-shaped trajectory.

During its oscillatory movement, the cam-type element is preferably contacted by the first housing such that the eccentricity of the outer surface thereof causes the cam-type element to be moved inside the first housing. The provision of the tie-rod makes it possible to transit this movement to the first runner that is moved closer to the first section.

The distance between the first runner and the first actuator can preferably be adjusted by operating the tie-rod, which, for example, can have a threaded coupling with a nut on the exterior of the first runner, and can engage with the cam-type element by means of the threaded coupling, which can be accessed by the user by means of a spanner.

In this first embodiment, the clamp load of each of the first and second clamping device can be adjusted independently of one another by operating the tie-rod and the wedge, respectively.

In a second embodiment of the invention, the first actuator comprises a first lever, which can be oscillated by means of the control element about a first movable axis of rotation.

The first lever is preferably connected to the transmission element at a spacing from the first axis of rotation.

The first actuator preferably also comprises a second lever that can be oscillated about a second axis of rotation.

The second lever is preferably connected to the first runner by means of a tie-rod that is fixed to the second lever at a spacing from the second axis of rotation.

The second lever is preferably also hinged with the first lever at the first moveable axis of rotation, which is also at a spacing from the second axis of rotation.

In this second embodiment, on account of the kinematic connection formed by the configuration of the first actuator, the action exerted by said first actuator on the first runner is dependent on the action exerted on the second actuator by the transmission element such that the relationship between the tightening actions of the two clamping devices is always constant.

In other words, the tightening action of the first and the second clamping device are always balanced.

In this way, it is sufficient to only adjust the clamp load once for both clamping devices. In particular, the second lever is supported on a slider at the second axis of rotation, which slider can be moved inside the first housing on account of the action of the adjustment member.

As in the first embodiment, said adjustment member comprises a wedge that is arranged between the slider and the first housing in order to move the slider, and therefore the first actuator.

In a second aspect, the invention is also directed to a tripod for video-photographic equipment, comprising:
- at least one leg that can be telescopically extended between a retracted configuration and an extended configuration, and comprises a first section, a second section that engages with the first section so as to slide axially, and a third section that engages with the second section so as to slide axially;
- a first clamping device that is provided between the first section and the second section for clamping or releasing the relative axial sliding motion of the first section with respect to the second section,
- a second clamping device that is provided between the second section and the third section for clamping or releasing the relative axial sliding motion of the second section with respect to the third section,
- a control element that is connected to the first clamping device in order to control the clamping or the releasing of the first clamping device,
- a transmission element that connects the first and said second clamping device in such a manner that the movement of said first clamping device causes said second clamping device to move in a similar manner such that said first and second clamping devices are simultaneously clamped and released, wherein the first clamping device is mounted on the second section and comprises:
- a first runner that can be moved away from and towards the first section in order to clamp or release the relative sliding motion thereof,
- a first lever, which can be oscillated by means of said control element about a first movable axis of rotation and is connected to said transmission element at a spacing from said first axis of rotation, and
- a second lever, which can be oscillated about a second axis of rotation, is connected to said first runner by means of a tie-rod, and is hinged to said first lever at said first movable axis of rotation at a spacing from said second axis of rotation.

BRIEF DESCRIPTION OF THE DRAWINGS

The features and advantages of the invention will become clearer from the detailed description of a few preferred embodiments thereof, which are illustrated by way of non-limiting example and with reference to the attached drawings, in which:

FIG. 1 is a perspective view of a tripod for video-photographic equipment in an extended and open configuration, said tripod being formed in accordance with a first embodiment of the present invention;

FIG. 2 is a perspective view of a leg of the tripod in FIG. 1 in a compact configuration and in which the clamping devices are open;

FIG. 3 is an enlarged partial and axially sectional view of a first clamping device of the leg in FIG. 2;

FIG. 4 is a lateral view of the first clamping device in FIG. 3, in which a few components have been removed for the sake of clarity;

FIG. 8 is a perspective view from above of a first clamping device of a tripod that represents a second embodiment of the invention, in which a few components have been removed for the sake of clarity and in which the clamping device is in the open position;

FIG. 9 is a perspective view of the first clamping device in FIG. 8, in which additional components have been removed for the sake of clarity; and FIG. 10 is a similar view to FIG. 9, in which the first clamping device is in the closed position.

PREFERRED EMBODIMENTS OF THE INVENTION

Figure 5:
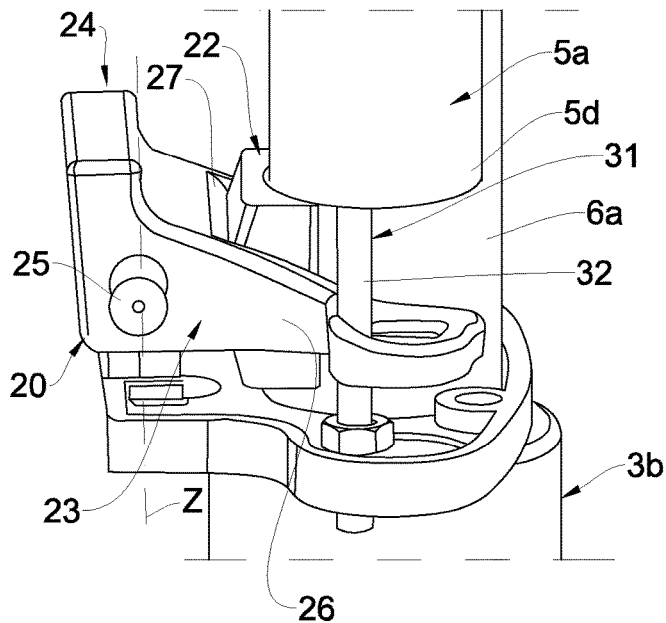
FIG. 5 is a lateral view of a second clamping device of the leg in FIG. 2, in which a few components have been removed for the sake of clarity.
Figure 6:
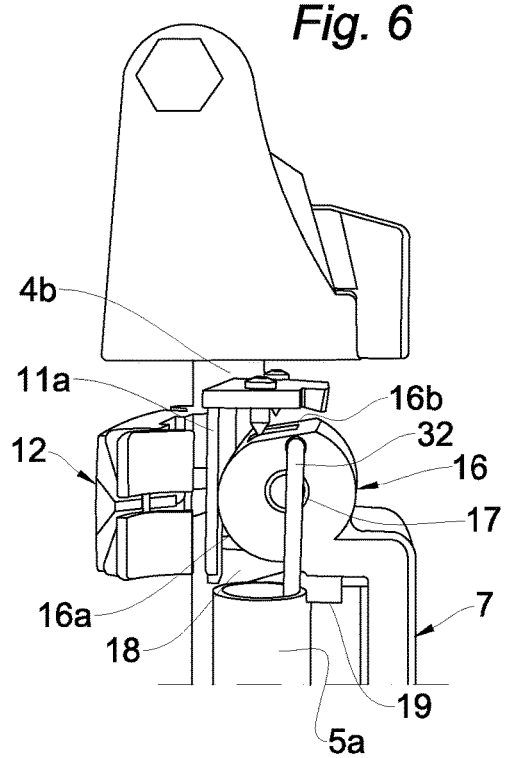
FIGS. 6 and 7 are similar views to FIGS. 4 and 5, respectively, in which the clamping devices are closed.
Figure 7:
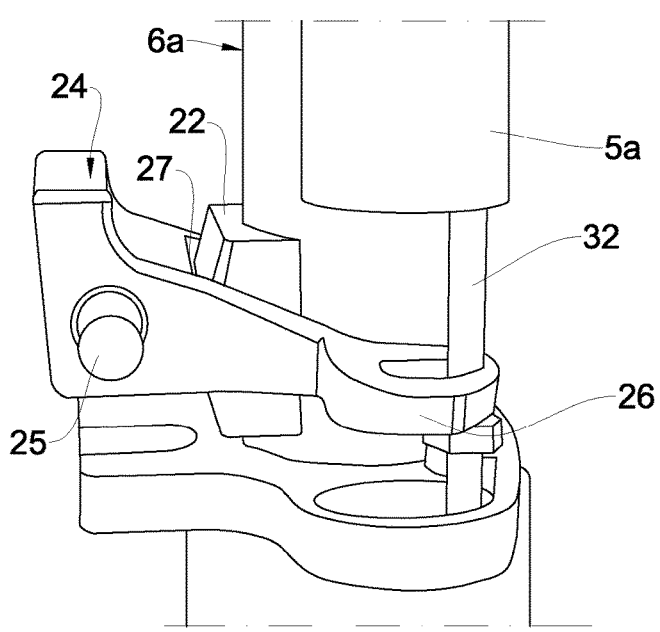

With reference to FIGS. 1 to 7 first of all, 1 indicates a tripod as a whole, which is formed in accordance with a first embodiment of the present invention.

The tripod 1 comprises a spider 2 on which a plurality of legs are hinged, which are all indicated by 3 and a first end 3a of each of which is hinged to the spider 2, while a second opposite end is provided with a foot 3b that forms the support base for the leg 3.

A head 2a for supporting video-photographic equipment can be suitably mounted on the spider 2 in ways known in the industry.

Each leg 3 is hinged to the spider 2 so that it can oscillate between an open configuration, in which the legs 3 are moved away from one another in order to increase the bearing plane of the tripod 1 on the ground (shown in FIG. 1), and a closed configuration, in which the legs 3 are moved towards one another.

Each leg 3 can telescopically extend along a longitudinal axis X and comprises a first section 4 that is hinged to the spider 2, a second section 5 that engages with the first section 4 so as to slide axially, and a third section 6 that engages with the second section 5 so as to slide axially and on which the foot 3b is mounted.

In the preferred embodiment described here, the first section 4 comprises a pair of parallel tubes 4a and 4b, the second section 5 comprises a pair of parallel tubes 5a and 5b that are slidingly arranged between the tubes 4a and 4b, and the third section 6 comprises just one tube 6a that is slidingly arranged between the tubes 5a and 5b.

Each leg 3 also comprises a first clamping device 10 that is arranged between the first section 4 and the second section 5 in order to clamp and release the relative sliding motion between the two sections, and a second clamping device 20 that is provided between the second section 5 and the third section 6 for the same purpose.

In this way, the three telescopic sections of the leg 3 can be fixed in any desired relative position.

The first clamping device 10 comprises a box-shaped first housing 11, which is fixed to a first end 5c of the second section 5 that faces the spider 2, and in which housing sliding seats are made for the tubes 4a and 4b of the first section 4.

The first clamping device 10 also comprises a first runner 12 that can be moved inside the first housing 11 towards the tubes 4a and 4b in a direction that is substantially perpendicular to the longitudinal axis X so as to push them against the respective seats of the first housing 11 and the stop them from sliding. In particular, the first runner 12 acts on the tubes 4a and 4b by pushing respective pairs of braking elements 12a against them, which braking elements are moved by the first runner 12 in a direction that has both a component that is perpendicular to the axis X so as to contact the tube 4a or 4b, and a component that is parallel to the axis X so as to stop against the first housing 11 and to limit possible oscillatory movements of the tube inside the first housing 11.

A spring 13 is arranged between the first housing 11 and the first runner 12 in order to push said first runner to move away from the tubes 4a, 4b.

The first runner 12 is also connected to a first actuator 15 by means of a tie-rod 14, which actuator is provided inside the first housing 11 on the opposite side to the first runner 12 with respect to the tubes 4a and 4b.

The first actuator 15 comprises a cam-type element 16, which can oscillate about a pin 17 having an axis Y to which the tie-rod 14 is fixed. The outer surface of the cam-type element 16 has an entirely eccentric profile that has a substantially cylindrical portion 16a and a flattened portion 16b.

The tie-rod 14 is a threaded pin that passes through the pin 17 and the first runner 12 and is provided with a head 14a that comes into contact with the pin 17 and can be driven by a user, and screwed onto a nut 14b arranged outside the first runner 12 on the opposite side to the pin 17.

On the side of the first runner 12, the cam-type element 16 faces a wall 11a of the first housing 11.

The cam-type element 16 is also supported on a slider 18, which can move to a limited extent inside the first housing 11 in a direction that is parallel to the axis X so as to move the first actuator 15 in said direction.

For this purpose, the slider 18 is in turn supported on a wedge 19 that can move in a direction that is perpendicular to the axis X as a result of the action of a threaded pin 19a, which can be actuated by the user by means of a spanner.

The wedge 19 and/or the slider 18 are in contact with one another in the region of an inclined surface such that the movement of the wedge 19 in a direction that is perpendicular to the axis X causes the slider 18 to move in a direction that is parallel to the axis X.

Together, the slider 18, the wedge and the threaded pin 19a form an adjustment member 30 of the second clamping device 20, as explained more clearly in the following.

The first actuator 15 is also connected to a control element 7 that extends from the cam-type element 16 on the opposite side to the first runner 12.

The control element 7 is formed by a handle that can be actuated by a user and controls the cam-type element 16 such that it oscillates about the axis Y.

The first actuator 15 is also connected to the second clamping device 20 by means of a transmission element 31 comprising a pair of rods 32 that are fixed to the cam-type element 16 in an eccentric position with respect to the axis of rotation Y.

The rods 32 extend through the tubes 5a and 5b from the cam-type element 16 up to the second clamping device 20.

The second clamping device 20 comprises a second housing 21, which is fixed to a second end 5d of the second section 5 that is opposite the first end 5c, and in the centre of which housing a seat is made in which the tube 6a of the third section 6 is slidingly held.

The second clamping device 20 comprises a second runner 22 that can be moved away from and towards the tube 6a, and a second actuator 23 that is connected to the second runner 22 for controlling the movement thereof.

The second actuator 23 comprises a lever 24 that can oscillate about a pin 25 having an axis Z, which pin is rotatably supported on the second housing 21. The lever 24 comprises two parallel arms 26 that extend from the pin 25 on sides opposite the tube 6a and are connected to the rods 32 of the transmission element 31 and contact the second runner 22 in the region of a limb 27 such that, when the lever 24 is oscillated about the axis Z, the limb 27 pushes the second runner 22 against the tube 6a.

When the control element 7 is in the raised position, the clamping devices 10 and 20 are open such that the sections 4, 5 and 6 can slide freely relative to one another.

In this position (FIGS. 3 and 4), the first runner 12 and the second runner 22 are spaced apart from the tubes 4a, 4b and from the tube 6a, respectively, and the cam-type element 16 has its flattened portion 16b facing the wall 11a.

When the control element 7 is lowered into the closed position (see FIG. 6), the cam-type element 16 is oscillated about the axis of rotation Y and comes into contact with the wall 11a with its cylindrical portion 16a, thereby moving the pin 17 away from the wall 11a. This brings about a tractive force of the tie-rod 14 and the consequent movement of the first runner 12 towards the tubes 4a and 4b.

At the same time, the oscillation of the cam-type element 16 causes the rods 32 to move, which are in particular raised towards the spider 2. This consequently causes the arms 26 of the lever 24 to be raised, said lever to oscillate about the axis Z, and the second runner 22 to move against the tube 6a as a result of being pushed by the limb 27 (see FIG. 7).

In this way, the movement of the single control element 7 therefore brings about the simultaneous actuation of the first and the second clamping devices 10 and 20.

The clamp load of the first clamping device 10 is adjusted by screwing the tie-rod 14 onto the nut 14b by using a spanner on the head 14a thereof. The screwing or unscrewing action of the tie-rod 14 onto the particular nut 14b in fact changes the distance between the first runner 12 and the cam-type element 16.

The clamp load of the second clamping device 20 is instead adjusted by moving the wedge 19, and therefore the slider 18, by means of the threaded pin 19a. The movement of the slider 18 causes the cam-type element 16 to move in a similar manner along the axis X and consequently also the rods 32 connected to it, which rods in turn oscillate the lever 24 by moving the second runner 22 closer to or further away from the tube 6a.

FIGS. 8 to 10 show a second embodiment of the tripod according to the invention, indicated as a whole by 100.

Components of the tripod 100 that are similar to those of the tripod 1 are indicated by the same reference numerals.

The tripod 100 differs from the tripod 1 in that the first clamping device 10 has a different structure.

In particular, the first clamping device of the tripod 100 comprises a first actuator 115 that has a different design to the first actuator 15 of the tripod 1, which advantageously makes it possible to balance out the clamp loads of the first and the second clamping devices 10 and 20, and therefore also makes it possible to provide just one adjustment member for both clamping devices.

The first actuator 115 therefore comprises a first lever 101, which is fixed to the control element 7, and a second lever 102, which is hinged on the first lever 101 and connected to the first runner 12.

The first lever 101 comprises a pair of parallel arms 103 that are fixed to the control element 7 and are joined by a transverse pin 104 that is held in a seat 105 in the second lever 102.

Similarly to the embodiment described previously, the rods 32 that connect the first actuator 115 to the second actuator 23 are also fixed on the arms 103 at a spacing from the pin 104 and on the opposite side to the control element 7.

The pin 104 defines a first axis of rotation Y' of the first lever 101, which can move with respect to the first housing 11.

The second lever 102 can in turn oscillate about a second axis of rotation Y", which is defined by a cylindrical portion 106 of the second lever 102.

The second lever 102 is fixed to the first runner 12 at a spacing from the second axis of rotation Y" and on the opposite side to the pin 104 by means of a pin 107 that connects it, thereby allowing the lever 102 to oscillate with respect to the first runner 12.

The second lever 102 is supported on the adjustment member 30 by the cylindrical portion 106, which adjustment member, similarly to in the previous example, comprises the slider 18 that can be moved in a direction that is parallel to the axis X by means of a wedge 19 that can be moved in a direction that is perpendicular to the axis X by means of the threaded pin 19a.

In this second embodiment, by lowering the control element 7, the first lever 101 oscillates about its axis of rotation Y' and therefore the rods 32 positioned on the opposite side to the pin 104 are raised. The resultant force exerted on the arms 103 by the control element 7 and by the rods 32 is transmitted from the pin 104 to the second lever 102 which, as a result, is also oscillated about the second axis of rotation Y" (see FIG. 10). The oscillation of the second lever 102 causes the first runner 12 to be moved towards the tubes 4a and 4b by means of the pin 107, while the second runner 22 is pushed against the tube 6a as a result of the rods 32 being raised, as in the tripod 1.

It is noted that the force with which the first runner 12 is moved is directly dependent on the force with which the rods 32 cause the second runner 22 to move, and therefore the clamp loads of the two clamping devices are always proportional to one another.

Therefore, by adjusting the position of the second lever 102 by means of the adjustment member 30 in exactly the same way as in the previous example, the clamp load of both the first and the second tightening device is varied.

The present invention therefore solves the problem outlined above with reference to the cited prior art.

Of course, in order to meet specific and contingent needs of the application, a person skilled in the art can add additional modifications and variants to the invention described above, provided that these are covered by the scope of protection defined by the following claims.

The invention claimed is:

1. Tripod (1; 100) for video-photographic equipment, comprising:
   at least one leg (3) that can be telescopically extended between a retracted configuration and an extended configuration and comprises a first section (4), a second section (5) that engages with said first section so as to slide axially, and a third section (6) that engages with said second section so as to slide axially;
   a first clamping device (10) that is provided between said first section (4) and said second section (5) for clamping or releasing the relative axial sliding motion of said first section with respect to said second section,
   a second clamping device (20) that is provided between said second section (5) and said third section (6) for clamping or releasing the relative axial sliding motion of said second section with respect to said third section,
   a control element (7) that is connected to said first clamping device (10) in order to control the clamping or the releasing of said first clamping device,
   a transmission element (31) that connects said first and said second clamping device in such a manner that the movement of said first clamping device (10) causes said second clamping device (20) to move in a similar manner such that the first and second clamping devices are simultaneously clamped and released, and
   an adjustment member (30) for said second clamping device (20), which is provided at said first clamping device (10) in order to adjust the clamp load of said second clamping device (20) by means of said transmission element (31).

2. The tripod according to claim 1, wherein said first clamping device (10) is mounted on said second section (5) and comprises a first runner (12) that is movable away from and towards said first section (4) in order to clamp or release the relative sliding motion thereof, and a first actuator (15; 115) that is connected to said control element (7) and to said first runner (12) such that said first runner (12) is moved away from and towards said first section (4) when said first actuator (15; 115) is moved away from said control element (7).

3. The tripod according to claim 1, wherein said second clamping device (20) is mounted on said second section (5) and comprises:
   a second runner (22) that is movable away from and towards said third section (6) in order to clamp or release the relative sliding motion thereof, and
   a second actuator (23) that is connected to said second runner (22) and to said transmission element (31) such that said second runner is moved away from and towards said third section when said second actuator (23) is moved by said transmission element (31).

4. The tripod according to claim 3, wherein said second runner (22) is moved away from and towards said third section following an oscillatory movement of said second actuator (23) that is brought about by the movement of said transmission element (31).

5. The tripod according to claim 2, wherein said transmission element (31) is connected to said first actuator such that an oscillatory movement of said first actuator (15; 115) causes said transmission element (31) to move and said second actuator (23) to consequently oscillate.

6. The tripod according to claim 1, wherein said adjustment member (30) is provided to move said first clamping device (10) with respect to said second section (5).

7. The tripod according to claim 2, wherein said first clamping device (10) comprises a first housing (11) that is fixed to said second section (5), and said adjustment member (30) comprises a slider (18) that is slidable inside the first housing and on which said first actuator (15; 115) is supported.

8. The tripod according to claim 7, wherein said adjustment member (30) comprises a wedge (19) that is arranged between said slider (18) and said first housing (11) and is movable so as to move said slider (18) with respect to said first housing (11).

9. The tripod according to claim 2, wherein said first actuator (15) comprises a cam-type element (16) that can be oscillated about an axis of rotation (Y) by means of said actuating element (7), said cam-type element (16) being connected to said first runner (12) by means of a tie-rod (14), said transmission element (31) being connected to said cam-type element (16) in an eccentric position with respect to said axis of rotation (Y).

10. The tripod according to claim 2, wherein said first actuator (115) comprises:
- a first lever (101), which can be oscillated by means of said actuating element (7) about a first movable axis of rotation (Y') and is connected to said transmission element (31) at a spacing from said first axis of rotation (Y'), and
- a second lever (102), which can be oscillated about a second axis of rotation (Y"), is connected to said first runner (12) and is hinged to said first lever (101) at said first movable axis of rotation (Y') at a spacing from said second axis of rotation (Y").

11. The tripod according to claim 1, wherein said second section (5) comprises at least one tube (5a, 5b) and said transmission element (31) extends inside said at least one tube between said first clamping device (10) and said second clamping device (20).

* * * * *